United States Patent [19]

Srivastava et al.

[11] 4,084,178
[45] Apr. 11, 1978

[54] AUTOMATIC HUE CONTROL CIRCUIT

[75] Inventors: Gopal K. Srivastava, Schaumburg; Dennis W. Rhee, Palatine, both of Ill.

[73] Assignee: Admiral Corporation, Schaumburg, Ill.

[21] Appl. No.: 683,317

[22] Filed: May 5, 1976

[51] Int. Cl.² .......................................... H04N 9/535
[52] U.S. Cl. .................................................. 358/28
[58] Field of Search ............................. 358/28, 30, 40

[56] References Cited

U.S. PATENT DOCUMENTS

| | | | |
|---|---|---|---|
| 3,663,744 | 5/1972 | Harwood | 358/28 |
| 3,950,780 | 4/1976 | Freestone | 358/28 |
| 3,950,781 | 4/1976 | Miyamoto | 358/28 |
| 3,996,608 | 12/1976 | Harwood | 358/28 |

*Primary Examiner*—Robert L. Griffin
*Assistant Examiner*—Aristotelis M. Psitos
*Attorney, Agent, or Firm*—R. Lewis Gable

[57] ABSTRACT

An automatic hue control circuit is disclosed for a color television receiver, wherein the flesh-tone signals of the reproduced image are enhanced by spreading the phase angle between the R-Y and the B-Y reference signals before applying them to their respective demodulators. In one aspect of the invention, the flesh-tone enhancement by phase-shifting the R-Y and B-Y signals occurs only for positive values of the flesh-tone signals. In a further aspect of this invention, a simplified automatic hue control circuit is disclosed as comprising a matrix for receiving, respectively, the R-Y, the G-Y and the B-Y color signals to obtain a DC quiescent voltage with which the flesh-tone signal, as indicated by the sum of the R-Y and the G-Y signals, is compared to render conductive a switch, illustratively in the form of a diode, whereby the phase-shift is imparted to the R-Y and B-Y reference signals. In particular, the desired phase shift between the R-Y and B-Y signals is effected only when the flesh-tone signals are of a positive value, whereby a more accurate color reproduction is provided.

10 Claims, 3 Drawing Figures

AUTOMATIC HUE CONTROL CIRCUIT

BACKGROUND OF THE INVENTION

1. Field of the Invention

This invention is directed toward color television receivers and in particular toward those color television receivers including automatic hue control whereby flesh-tone response is most accurately controlled without distorting other reproduced colors.

2. Description of the Prior Art

Generally, present-day color television receivers include circuitry for selective modification of hue signals by a viewer to effect a desired flesh-tone response. Factually, a relatively constant flesh-tone response is provided automatically in most present-day television receivers without any undue attention or adjustment by a viewer.

Specifically, many forms of hue compensation circuitry for flesh-tone enhancement include apparatus for phase-shifting a chrominance signal applied to the color demodulator stages. For example, U.S. Pat. No. 3,525,802, entitled "Hue Expander Circuit", issued Aug. 25, 1970, in the name of P. J. Whiteneir, Jr., provides apparatus for automatically shifting signals in the red and yellow sections of the chrominance diagram in a manner which provides a hue representative of flesh tone.

In another known form of hue compensation apparatus, chrominance signals are shifted by a phase-shift network of passive components series-connected to a chrominance signal source. Such apparatus appears on pages 104 and 105 of an article entitled, "Solid State Controls Head New Color TV Lineup", in the June 1970 edition of *Electronics*. Thus, relatively inexpensive passive components are substituted for relatively expensive active components in an effort to provide the desired enhanced flesh-tone control.

In still another form of hue compensation apparatus, U.S. Pat. No. 3,654,384, entitled "Apparatus for Modifying Electrical Signals", issued Apr. 4, 1972 in the name of John M. Kresock, suggests hue modification circuitry wherein the phase angles of the reference signal applied to the demodulators as well as the magnitudes thereof are altered to effect an improved flesh-tone reproduction. Thus, a shift in phase separation of the demodulation axes as well as a change in the magnitude of the reference signals applied to the two demodulators provides a desired shift in flesh tone.

Although the above-mentioned systems have been and still are widely accepted in present-day color television manufacture, it has been found that each leaves something to be desired. For example, systems which include active components are relatively expensive and appear to be more subject to catastrophic failure than circuits with passive components.

Also, circuitry employing passive components wherein the desired flesh-tone region appears to be enhanced at reduced cost of components and an increased reliability, has been found somewhat undesirable in image reproductive capabilities. More specifically, it has been found that circuitry wherein the R-Y and B-Y reference axes are shifted to an angle greater than 90° tend to provide an image response wherein green signals appear blue rather than green due to the shift in the output of the B-Y demodulator from a negative to a positive value. Obviously, such an undesired shift in color response is deleterious to truly authentic and desired image reproduction capabilities. An explanation of the shift of green signals to appear blue is provided below with respect to FIG. 1.

Referring to the prior art chromaticity drawing of FIG. 1, a first reference or R-Y signal available from the reference oscillator signal source normally is depicted as lagging a color burst signal by a phase angle of 90°. Also, a second reference signal or B-Y signal or is normally depicted as lagging the color burst signal by a phase angle of 180°. Thus, normal operation provides a first reference signal R-Y lagging the burst signal by 90°, and a second reference signal B-Y lagging the burst signal by 180° and lagging the first reference signal by 90°.

To illustrate the effect of the phase-shift network normally employed in flesh-tone or hue modification circuitry as described above, it may be assumed that the normal phase-shift network is altered. Thereupon, the R-Y and B-Y reference signals are shifted to a positional location, indicated as (R-Y)' and (B-Y)', having an increased phase angle therebetween which is preferably in the range of about 130° as compared with the previous 90°.

Assuming a vector "A" representative of a flesh-tone on the phase diagram of FIG. 1, there would be provided a positive-going R-Y vector component represented as "$a$", and a negative-going B-Y vector component represented as "$b$". Moreover, alteration of the phase shift network to enhance flesh tones causes a shift in the phase angle intermediate the R-Y and B-Y vector components from the above-mentioned 90° value to an angle of about 130°. Thereupon, the new R-Y vector component $a'$ remains positive-going, while the new B-Y vector component $b'$ remains negative-going. Thus, the polarity of the R-Y and B-Y vectors remains unchanged and the desired flesh-tone feature is attained.

However, assuming a vector "B" represents the color green on the phase diagram, there would be a negative-going R-Y vector component represented as "$c$" and a negative-going B-Y vector component represented as "$d$". Upon alteration of the phase-shift network to enhance flesh tones, the phase angle shifts from 90° to about 130°, whereupon the negative-going R-Y vector component "$c$" remains as a negative-going component $c'$, while the negative-going B-Y component "$d$" shifts to a positive-going component $d'$. Thus, the previously-mentioned vector B representative of the color green now undesirably appears as a bluish color due to the shift in the B-Y vector component "$d$" from a negative-going value to a positive-going value $d'$. As a result, it can be seen that, while it is desirable to shift R-Y and B-Y reference signals to increase the phase angle therebetween to 130° for flesh-tone colors represented by vector A, it is undesirable to do so for other colors such as green, represented by vector B.

In order to prevent the distortion of green colors upon a television receiver display, it has been suggested by U.S. Pat. No. 3,882,534 by Gopal Krishna Srivastava, that the R-Y reference signal, according to which of the red signals are reproduced, be used to determine selectively when the phase shift between the R-Y and B-Y reference signals is effected. Thus, the normal phase shift of 90° between the R-Y and B-Y signals is maintained during that portion of the phase spectrum in which the green G-Y signal occurs, such that substantially no distortion occurs in its reproduction. Referring to FIG. 1, the operation of the automatic tint control of the above-noted patent is seen as effecting the desired phase shift between the R-Y and B-Y difference signals for positive values of the difference signal R-Y whereby the reproduction of the flesh-tone signal "A" is improved. However, for negative values of R-Y, the phase-shifting circuit is turned off, whereby the green signal "B" is not affected and therefore, the display thereof is not distorted. In particular, the R-Y reference signal as obtained from its color demodulator, is compared with respect to a quiescent voltage provided by a DC restorer circuit, corresponding to the outputs of the R-Y demodulator when no color signal is produced. The DC restorer as described in the noted U.S. Pat. No. 3,882,534 involves a fairly complex circuit that is responsive to the horizontal deflection circuit. A comparison and switching circuit also are involved whereby the DC quiescent voltage, as established by restorer circuit, is compared with the R-Y signal. As a result, when the R-Y signal is positive, as indicated by the output of the comparator circuit, the switch circuit is rendered conductive, whereby a phase-shifting circuit is rendered active to impart the desired phase shift between the R-Y and B-Y signals before they are imposed upon their respective demodulators. As mentioned above, one problem with the circuit as described in the noted patent is that its circuitry tends to be complex and therefore expensive. Secondly, the reference phase-shifting circuit is energized in response to the R-Y signal only to effect the desired enhancement of the flesh-tone signals. However, the yellow-green signals which are approximately in the phase vicinity of the B-Y axis, are not flesh-tone enhanced, since in the yellow-green signals, the R-Y signal which energizes the switching circuit is either not present or of a significantly lower level such that it will not energize the switching circuit.

SUMMARY OF THE INVENTION

It is therefore an object of the present invention to provide an improved automatic hue control circuit for a television receiver of less complicated and expensive design.

It is a further object of this invention to provide an improved automatic hue control circuit for a television receiver wherein the phase difference between the R-Y and B-Y color difference signals is increased for a selected phase interval in a manner whereby the reproduction of the flesh-tones is enhanced with a minimum of distortion of the reproduction of the other color signals.

In accordance with these and other objects of the present invention, there is provided an automatic hue control circuit for a television receiver wherein the phase angle between the R-Y and B-Y color difference signals increases for a selected phase interval according to the positive values of the flesh-tone signals. In an illustrative embodiment of this invention in which the G-Y and R-Y signals are summed to provide an indication of the flesh-tone signal and to actuate a circuit for imparting the desired increased phase shift between the R-Y and B-Y color difference signals for that selected phase interval corresponding to the positive values of the aforedefined flesh-tone signals.

In a further aspect of this invention, a simplified hue control circuit comprises a summing means in the form of a matrix, whereby the R-Y, G-Y and B-Y color difference signals are summed to provide a reference against which the flesh-tone color signal is compared by a suitable comparator means in the form of a transistor. The flesh-tone color signal is derived by a resistor matrix, which sums the G-Y and R-Y signals and is applied to the emitter of the aforementioned transistor whereby the comparator means provides an output for positive values of the flesh-tone signal. A switch means in the form of a diode is responsive to the output of the comparator means, whereby a phase-shifting circuit is actuated to impart an increased phase shift between the R-Y and B-Y color reference signals.

BRIEF DESCRIPTION OF THE DRAWINGS

These and other objects and advantages of the present invention will become more apparent by referring to the following detailed description and accompanying drawings, in which.

PREFERRED EMBODIMENT OF THIS INVENTION

Figure 2:
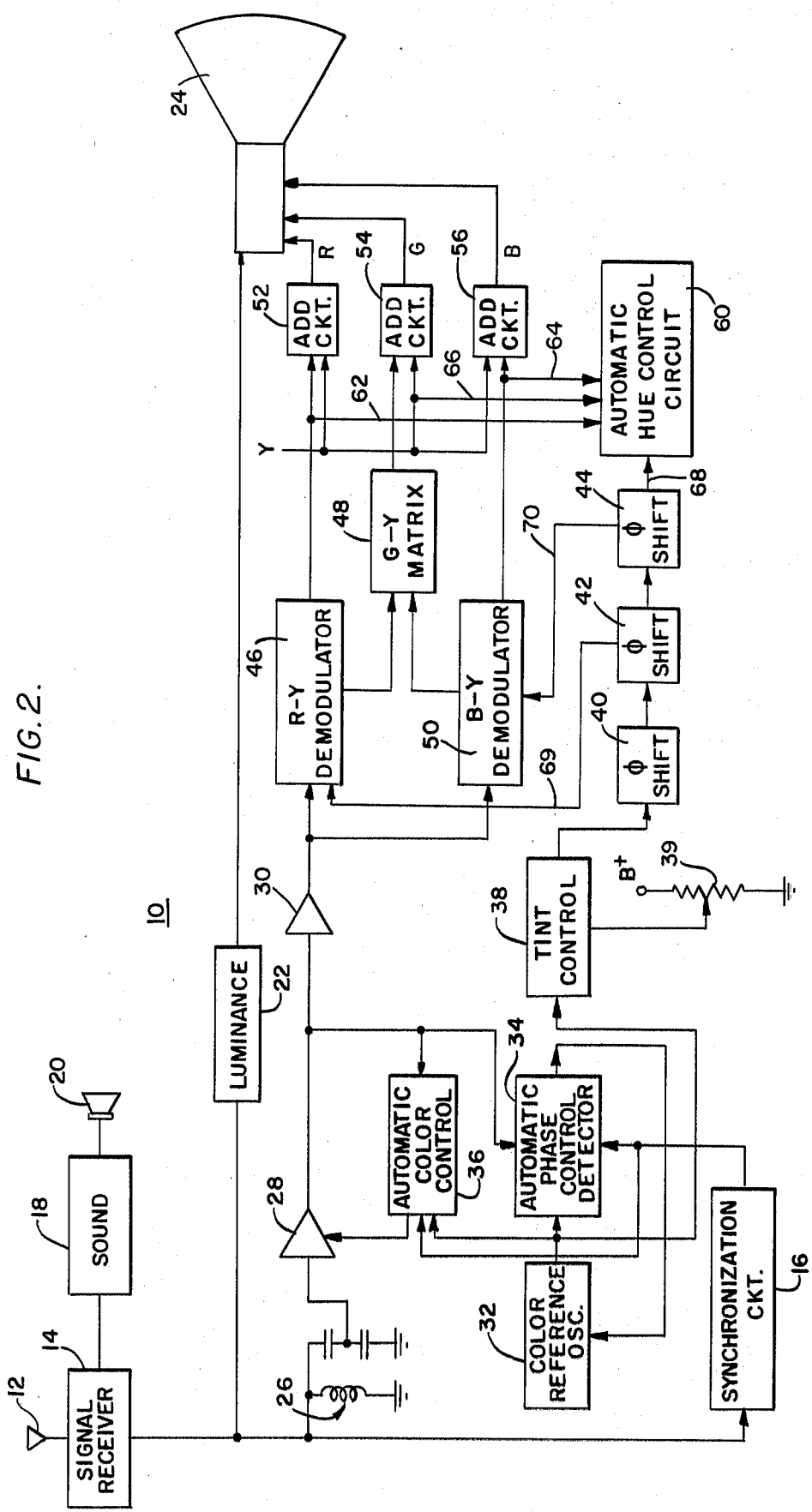
FIG. 2 is a schematic showing in block form of a color television receiver, illustrating the interconnection thereto of the automatic hue control circuit in accordance with the teachings of this invention.

Referring now to the drawings and in particular to FIG. 2, there is shown a color television receiver 10 into which an automatic hue control 60, in accordance with the teachings of this invention, has been incorporated. The color television receiver 10 includes an antenna 12 coupled to a signal receiver 14 having the usual RF, IF, oscillator and mixer stages. The signal receiver 14 provides one output which is applied to a sound channel 18 coupled to a loudspeaker 20 for providing audio information.

Another output from the signal receiver 14 is applied to a luminance channel 22 which, in turn, is coupled to a cathode ray tube or display device 24. Thus, the luminance signals representative of monochrome or brightness information are applied to the cathode ray tube 24 in the usual manner. Moreover, an output from the signal receiver 14 is applied to a synchronization circuit 16, which in turn provides an output indicative of the horizontal flyback transfer to the chrominance processing channel or circuitry, as now will be explained. Further, the output of the signal receiver 14 is applied to the chrominance channel comprising, as shown in FIG. 2, a coupling circuit 26 for applying the output of the signal receiver 14 in-series to first and second chroma amplifiers 28 and 30, for successively amplifying the chrominance information, including the color burst signals. As is further shown, an automatic color control circuit 36 is responsive to the output of the first chroma amplifier 28 and to the output of a color reference oscillator 32 to adjustably control the gain of the first chroma amplifier 28, thereby automatically setting the saturation of the color burst signal. The color reference oscillator 32 develops reference oscillation signals which are applied, as mentioned above, to the automatic color control circuit 36, to an automatic phase control detector 34 and also to a tint control circuit 38. As is well-known in the art, the color reference oscillator 32 provides an output signal of 3.58 MHz, which is compared by the automatic phase control detector 34 with the color burst as transmitted and received by the signal receiver 14. An output from the automatic phase control detector 34 is applied back to the color reference oscillator 32, whereby it is "locked" in-phase with the color burst signal. In particular, the output of the phase control detector 34 is, in effect, an error signal, driving the color reference oscillator 32 to provide an output in-phase with the color burst signal as indicated by the zero output from the automatic phase control detector 34, as is well-known in the art. As indicated in FIG. 2, the automatic phase control detector 34 is responsive to the horizontal flyback signal to selectively gate the operation of the automatic phase control detector 34 to detect the color burst signal.

The phase-locked output of the color reference oscillator 32 is applied to the automatic color control 36, as explained above, and also to the tint control 38 which is coupled, as shown in FIG. 2, to a hue control in the form of a potentiometer 39, which may be adjusted by the viewer in order to set the desired hue as displayed upon the color CRT 24. The adjustment of the potentiometer 39 varies the phase of the color reference oscillator output, which in turn is applied serially to a plurality of phase shift circuits 40, 42 and 44. A further input to the aforementioned phase shift circuits 40, 42 and 44 is derived from an automatic hue control circuit 60, as will be explained later in detail, along the conductor 68. The outputs of the phase shift circuits 42 and 44 are applied, respectively, to first inputs of an R-Y demodulator circuit 46 and a B-Y demodulator circuit 50. In turn, outputs of the R-Y demodulator circuit 46 and of the B-Y demodulator circuit 50 are applied to a conventional G-Y matrix circuit to provide a G-Y difference signal. As indicated in FIG. 2, the other input to the aforementioned demodulator circuits 46 and 50 is the chrominance signal as derived from the second chroma amplifier 30. In turn, the outputs of the R-Y demodulator circuit 46, the B-Y demodulator circuit 50 and the G-Y matrix circuit 48 are applied, respectively, to ADD circuits 52, 56 and 54. A signal indicative of Y also is applied to each of the ADD circuits 52, 54 and 56, whereby the red, blue and green signals derived respectively therefrom are applied to the corresponding electron guns of the color CRT 24. The outputs of the R-Y demodulator circuit 46, the B-Y demodulator circuit 50 and the G-Y matrix circuit 48, also are applied as by conductors 62, 64 and 66, respectively, to the automatic hue control circuit 60.

Figure 3:
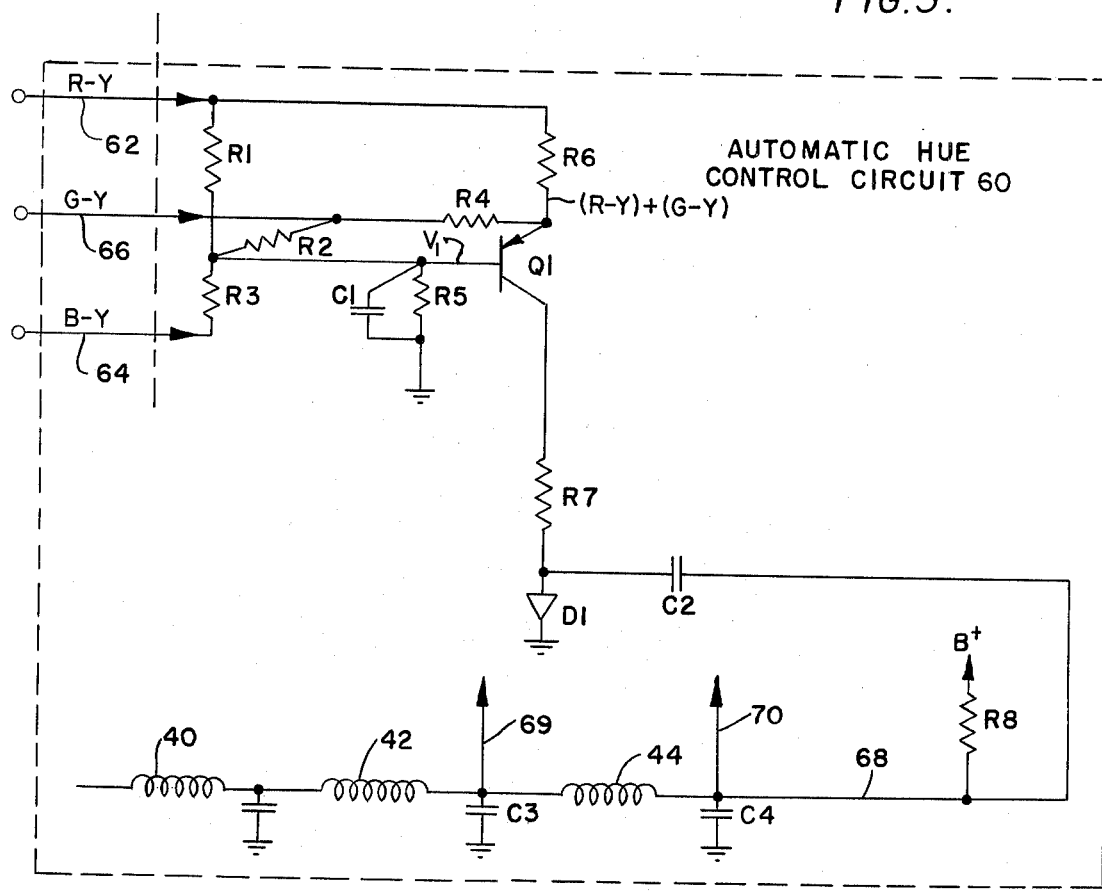
FIG. 3 is a detailed schematic circuit of the automatic hue control in accordance with the teachings of this invention.

In FIG. 3, there is shown in a detailed schematic, the automatic hue control circuit 60, as comprising a summing means in the form of a resistor matrix circuit to which the R-Y, G-Y and B-Y color difference signals are applied, respectively, by the conductors 62, 66 and 64. In particular, the R-Y color difference signal is applied to each of the resistors R1 and R6, while the color difference signal G-Y is applied via resistor R4 to the emitter of transistor Q1, and by the resistor R2 to the base of transistor Q1. The color difference signal B-Y is applied via resistor R3 to the base of transistor Q1. As a result, a quiescent voltage V1 is established at the base of transistor Q1 to establish a reference point with which a signal, in one illustrative embodiment of this invention, is indicative of the flesh-tones to be displayed. The matrix circuit comprised of resistors R1, R5, R2 and R3, provides DC quiescent voltage V1 in a simplified fashion without resort to particularly complicated circuitry, cancels out all color difference signals at its output, and further reduces quiescent voltage errors between any two color difference signals output in that all of the color difference signals and quiescent voltages are averaged by the aforedescribed network. As a result, the voltage applied to the base of transistor Q1 is an accurate, reliable source of the quiescent voltage with which the transistor Q1, acting as a comparison means, is able to compare a signal as applied to its emitter with that quiescent voltage applied to its base.

In a preferred embodiment of this invention, the G-Y and R-Y color difference signals are summed together by the resistors R6 and R4 to be applied to the emitter of transistor Q1; the summed signal is indicative of the flesh-tone signals to be displayed. In an alternate embodiment of this invention, the resistor R4 could be deleted so that the signal applied to the emitter of transistor Q1 would be solely the R-Y color difference signal. In the preferred mode of operation, the summed signal as applied to the emitter of transistor Q1, indicative of the flesh-tone signals, is compared with the quiescent voltage V1 applied to the base thereof. Thus, when the summed signals indicative of the flesh-tone signals exceeds the quiescent voltage, transistor Q1 is rendered conductive, to effect a phase shift between the R-Y and B-Y color reference signals, as will be explained.

As shown in FIG. 3, a capacitor C1 and a resistor R5 are connected in-parallel with each other, between the base of transistor Q1 and ground. The capacitor C1 filters the residual transients as established within the quiescent voltage V1, while the resistor R5 reduces the quiescent voltage by an amount equal to that voltage drop established between the base and emitter of the transistor Q1, to overcome the threshold offered by the base-emitter voltage drop of transistor Q1. Thus, when the summed voltages G-Y and R-Y are positive, i.e. indicating the existence of the flesh-tone signals, transistor Q1 is rendered conductive. In turn, a more positive voltage is applied to a diode D1, acting as a switch means, through the resistor R7. When the diode D1 is rendered conductive, a capacitor C2 is placed in-parallel with capacitor C4, i.e., as shown in FIG. 3, the capacitor C2 is connected from the midpoint of resistor R7 and diode D1 to capacitor C4, and when diode D1 is rendered conductive, capacitor C2 is connected to ground and in-parallel with capacitor C4. In turn, an inductance forming the phase-shift device 44 is interconnected between capacitor C4, and capacitor C3 and a further inductance forming the phase shift device 42. The point of interconnection between capacitor C4 and inductor 44 is connected via conductor 70 to the B-Y demodulator 50, whereas the point of interconnection between the inductors 44 and 42 is connected via conductor 69 to the R-Y demodulator circuit 46. As shown in FIGS. 2 and 3, the inductor 42 is further connected via the phase-shift device in the form of an inductor 40, to the tint control circuit 38.

In operation, when the diode D1 conducts, the capacitor C2 in effect is connected in-parallel with the capacitor C4, whereby a lagging phase shift is effected to the B-Y color difference signal and at the same time, an inductor loading is applied to the capacitor C3 whereby the R-Y color difference signal is phase-shifted in a leading manner. As a result, when the diode D1 or switch means is rendered conductive, the phase angle between the color difference signals R-Y and B-Y is increased, while, when the diode D1 is rendered nonconductive, a relatively constant phase shift angle as established by the inductor 42, capacitor C3, inductor 44, capacitor C4 and resistor R8, is established between the color reference signals R-Y and B-Y.

Figure 1:
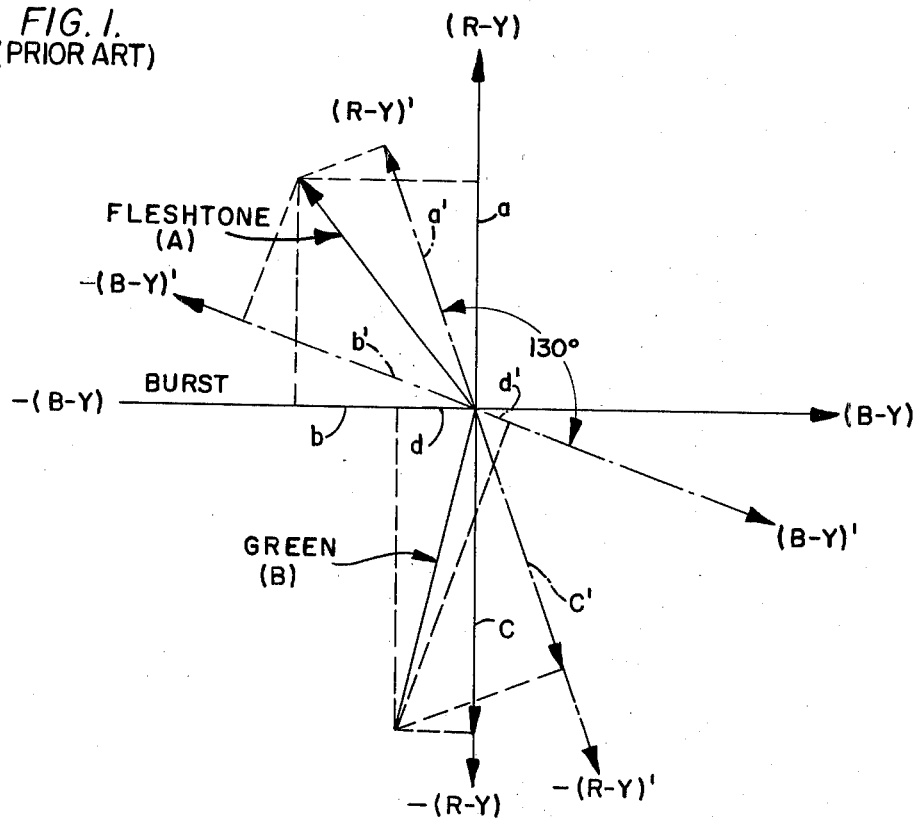
FIG. 1 is a chromaticity diagram to facilitate an understanding of the prior art.

Referring to FIG. 1, it can be seen that in the presence of the flesh-tone signal A as indicated by the sum of the G-Y and R-Y color difference signals, the transistor Q1 will be rendered conductive and that in turn, the switch means in the form of diode D1 also will be rendered conductive to effect the phase-shift between the color difference signals R-Y and B-Y to effect a more desirable presentation of the flesh-tone signals by the color display tube 24. However, in the absence of the flesh-tone signal A, the capacitor C2 is removed from across C4 and the phase angle established between the two color signals is approximately 90°, so that no distortion will be created in the reproduction of the green and cyan colors, both of which bear the minus (R-Y) signal, thus enjoying full color fidelity of the picture tube display.

Thus, it can be seen from the foregoing description that the color fidelity of the displayed color signals, and in particular the flesh-tones, is increased while not distorting or interfering with the production of other colors such as the cyan and green colors, with a circuitry that does not require a complex DC restorer circuit, but rather includes a relatively simple resistive matrix for establishing a quiescent voltage with which a comparator compares the quiescent voltage with the flesh-tone signal. If the presence of a flesh-tone signal is detected, a relatively simple switch means in the form of a diode is turned on, whereby the desired phase-shift is effected to enhance the display of the flesh-tone colors.

Numerous changes may be made in the above-described apparatus and the different embodiments of the invention may be made without departing from the spirit thereof; therefore, it is intended that all matter contained in the foregoing description and in the accompanying drawings shall be interpreted as illustrative and not in a limiting sense.

What is claimed is:

1. A color television receiver comprising:
   a. source means for providing a chrominance signal;
   b. source means for providing a reference signal;
   c. first, second and third means for providing first, second and third color difference signals, each coupled to receive the chrominance signal;
   d. phase-shift means coupled to receive the reference signal and selectively actuatable for phase-shifting the reference signal to provide at least first and second output signals phased separately from each other to be applied to said first and third means;
   e. summing means responsive to the output of each of said first, second and third means for providing a quiescent voltage;
   f. comparison means coupled to at least one of said first, second and third means for providing an output when the output of said one means exceeds the quiescent voltage; and
   g. switch means responsive to the output of said comparison means for selectively actuating said phase-shift means to vary a phase-shift angle between its first and second output signals applied to said first and third means.

2. A color television receiver as claimed in claim 1, wherein said comparison means is responsive to the output of said first means for providing its output when the output of said first means exceeds the quiescent voltage.

3. A color television receiver as claimed in claim 1, wherein there is included second summing means for summing the outputs of said first and second means, and applying the summed signals to said comparison means to be compared thereby with the quiescent voltage.

4. A color television receiver as claimed in claim 3, wherein the summed signal of said second summing means is indicative of flesh-tones to be displayed by said color television receiver.

5. A color television receiver as claimed in claim 1, wherein said first-mentioned summing means comprises a resistive matrix comprised of first, second and third resistors for summing and applying the outputs of each of said first, second and third means to a common point to provide the quiescent voltage.

6. A color television receiver as claimed in claim 5, wherein there is included second summing means for summing the outputs of said first and second means to provide a signal to said comparison means indicative of flesh-tone color signals.

7. An automatic hue control circuit for a color television receiver, including chrominance and reference oscillator signal sources, comprising:
   a. red and blue demodulator circuits for providing red and blue color difference signals, respectively, each of said demodulator circuits coupled to receive the chrominance signal;
   b. means for producing a green color difference signal;
   c. a phase-shift circuit coupled to the reference signal source and selectively actuatable for phase-shifting the reference signal to provide phase-shifted first and second reference signals applied to the red and blue demodulator circuits;
   d. a summing matrix circuit responsive to each of the red, green and blue color difference signals for providing a quiescent voltage;
   e. means for providing a signal indicative of flesh tone;
   f. comparison means responsive to the signal indicative of flesh tone for comparing same with respect to the quiescent voltage for providing an actuating output when the flesh-tone color signals are present; and
   g. switch means responsive to the actuating output of said comparison means for actuating selectively said phase-shift means to vary the phase-shift between the first and second reference signals.

8. The automatic hue control circuit as claimed in claim 7, wherein the summing matrix circuit comprises first, second and third resistors for applying and summing to a common point the red, green and blue color difference signals.

9. The automatic hue control circuit as claimed in claim 8, wherein said comparison means comprises a transistor, the base of which is coupled to receive the quiescent voltage and whose emitter is connected to receive the flesh-tone color signals.

10. The automatic hue control circuit as claimed in claim 9, wherein said flesh-tone signal providing means comprises a second summing circuit for receiving and summing the green and red color reference signals to produce the flesh-tone color signal to be applied to the emitter of said transistor.

* * * * *